Aug. 1, 1950     C. S. PENFOLD     2,516,907
COUPLING
Filed July 9, 1945

Charles S. Penfold
INVENTOR.

Patented Aug. 1, 1950

2,516,907

UNITED STATES PATENT OFFICE 2,516,907

COUPLING

Charles S. Penfold, Bronson, Mich., assignor to
H. A. Douglas Mfg. Co., Bronson, Mich., a corporation of Michigan Application July 9, 1945, Serial No. 603,766

6 Claims. (Cl. 285—174)

This invention relates to coupling devices and more particularly is directed to a plug carried by an end of a vacuum cleaner hose or conduit for connection with a receptacle or receiving means preferably provided in the end cap or closure of the cleaner.

One important object of the invention is to provide a plug in which practically no metal parts are exposed to accidently damage furniture, the floor and other objects thereon.

Another object is to provide a plug which is very light in weight and one to which the holding or latch means may be easily and quickly assembled.

A further object is to provide a plug consisting of few parts which can be economically manufactured.

Other objects and advantages of the invention will be understood after considering the description hereinafter set forth in conjunction with the annexed drawing.

Figure 1:
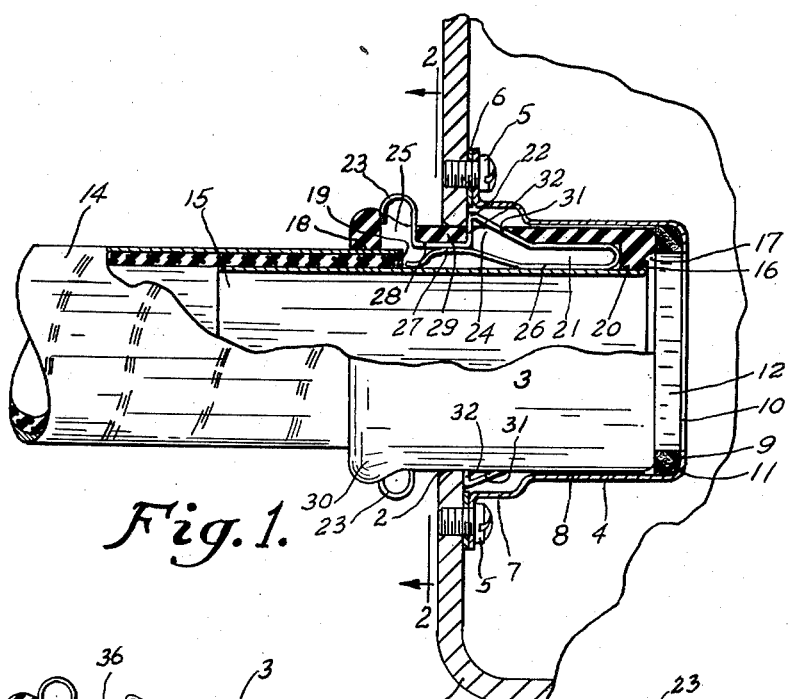
Figure 1 is a side view in elevation, with parts in section, showing the plug connected to a vacuum cleaner.
Figure 3:
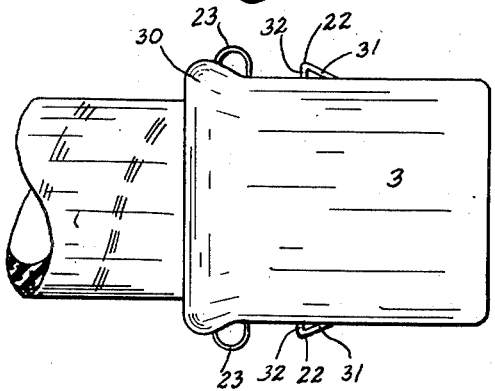
Figure 3 is a side view of the plug in finished form.
Figure 2:
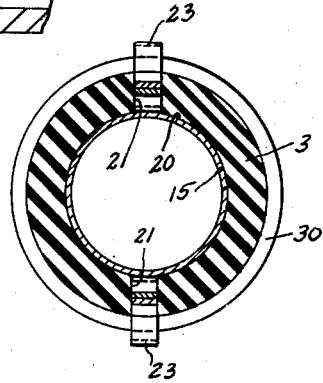
Figure 2 is a transverse section taken substantially on line 2—2 of Figure 1.

Referring to the first embodiment of the invention illustrated in Figures 1 through 3, numeral 1 represents the end wall or cap of a vacuum cleaner provided with an opening 2 within which the plug 3 is disposed. A receptacle or socket 4 is secured in air tight relation to the inner side of the end wall by screws 5 and a gasket 6. The receptacle includes a cylindrical portion 7 and a smaller and longer cylindrical portion 8 provided with an end wall 9 having an aperture 10. A resilient abutment 11 is seated and suitably secured against the end wall 9. An aperture 12 corresponding in size to the aperture 10 is provided in the abutment.

The plug 3 which is adapted for disposition in the receptacle is carried by the free end of a conventional flexible hose or conduit 4 by rotatably mounting the plug on a tubular bearing 15. The inner extremity of the bearing is preferably secured in the hose by any suitable means such as by glue or rivets and the outer extremity is provided with an outwardly extending radial flange 16 which is preferably received in a shallow annular recess 17 formed in the entrance end of the plug for holding the plug against axial movement in one direction. The plug is held against movement in the other direction by providing the opposite end of the plug with a relatively large round recess 18 which receives a portion of the hose. A washer 19 may be seated against the bottom of the recess in order to prevent some friction between the frayed or uneven end of the hose and the recess.

The plug is preferably made of a relatively light weight shockproof durable plastic material that can be moulded in one operation in order to reduce the costs of manufacture. The plug does not require a metal ferrule and no metal parts, other than the two latches, are exposed so the possibility of damage to furniture is lessened. The plug is preferably cylindrical in shape and provided with an axial hole 20 which rotatably receives the bearing 15.

The plug is also provided with a pair of diametrically disposed longitudinally extending channel recesses or pockets 21 which intersect the hole 20. Latches are disposed in the pockets, and each latch includes a catch part 22 and a finger operated part 23 which project outwardly through spaced apart openings 24 and 25, respectively, provided in the bottom wall of each channel recess. The latches may be constructed in various ways but those illustrated are preferably generally U shape and elongated with one leg having a portion 26 engaging the outer surface of the bearing 15 and a raised or curved portion 27 which resiliently engages the portion 28 between the catch and finger parts 22 and 23 of the other leg to assist in normally urging the parts to predetermined positions for the purpose intended. The portion 29 of the body is received by portions of the parts whereby to effect an interlocking relationship. The rear extremity of the body of the plug is preferably provided with an enlargement 30 which serves as a handle to better manipulate the plug.

The construction and arrangement lends itself to mass production because of few inexpensive parts which can be easily and quickly assembled. To assemble the parts it is merely necessary to insert the latches through the opening 20 of the body into the channel recesses whereupon the tubular bearing 15 is passed through the opening to hold the latches in place. With the parts so assembled the bearing is then inserted into the hose or conduit 14 and secured in place whereby there are just sufficient clearances to permit the plug to rotate with respect to the bearing. If a washer or ring 19 is used it is of course slipped over the bearing before the plug is secured to the hose.

To connect the plug to the vacuum cleaner it is merely necessary to grasp either the hose adjacent the plug or the handle of the plug and pilot the plug into the opening 2 of the cleaner and as it is directed into the receptacle the inclined cam portion 31 of each catch portion will be pressed inwardly by engaging the margin defining the opening 2, and when the entrance end of the plug engages the resilient abutment 11, the catches will snap outwardly so that the shoulder portions 32 thereof will engage the inner surface of the end wall or cap of the cleaner. The enlarged cylindrical portion 7 of receptacle provides a clearance space for the operation of the catch portions. This arrangement allows the hose to rotate with respect to the plug and the plug to some extend with respect to the cleaner so as to provide for better use of the accessories adapted for detachable connection with the opposite end of the hose and at the same time prevent kinking of the hose.

To release the plug from the cleaner it is only necessary to disengage the catch portions 22 from the cleaner wall by pressing inwardly on the finger parts or portions 23, and then pull the plug outwardly.

As stated above the latches may be constructed as desired.

Figure 4:
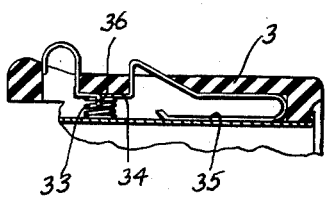
Figure 4 is a partial section of another embodiment of the invention.

Figure 4 illustrates a modified latching mechanism, in which a helical spring 33 serves to urge the leg portion 34 outwardly in addition to the action produced by the other leg portion 35. In this arrangement one end of the spring rides on the bearing and its other end is preferably held in place by a projection 36 provided on the outer leg between the finger and catch portions thereof.

Having thus described my invention, it is obvious that various other modifications may be made in the same without departing from the spirit of the invention; and, therefore, I do not wish to be understood as limiting myself to the exact form, construction, arrangement, and combination of parts herein shown and described.

I claim:

1. In a plug device of the kind described, an integral body provided with an axial opening, an aperture in said body and a pocket communicating with said aperture and said opening, latch means in said pocket having an operative portion projecting through the aperture, and a tubular member extending through said axial opening providing a bearing for said body and means for securing said latch means in said pocket.

2. In a plug device of the kind described, an integral body provided with an axial opening, an aperture in said body and a pocket communicating with said aperture and said opening, latch means in said pocket having an operative portion projecting through the aperture, a tubular member extending through said axial opening providing an integral bearing for said body and means for securing said latch means in said pocket, a recess provided in one extremity of said body, and a conduit having an end received in said recess and receiving a part of said tubular member.

3. In a plug device of the kind described, an integral body provided with an axial opening, an aperture in said body and a pocket communicating with said aperture and said opening, latch means in said pocket having an operative portion projecting through the aperture, a flanged tubular member extending through said axial opening providing an integral bearing for said body and means for securing said latch means in said pocket, and recesses provided adjacent the opposite extremities of said body receiving a conduit and the flange on the tubular member whereby to limit the axial movement of said body with respect to said member.

4. A plug device comprising, a one piece body provided with an axial opening, a pocket, and an aperture intersecting the pocket, latch means disposed in the pocket with a portion projecting through the aperture for operative connection with receiving means, a tubular member extending through said axial opening for securing said latch means in place, and said latch means having a yieldable portion acting on the projection portion for urging the latter outwardly to a predetermined position.

5. A plug device comprising, a one piece moulded plastic body provided with an axial opening, an integral pocket formed in said body and communicating with the opening, an aperture provided in the body, latch means provided in said pocket and having a portion extending through the aperture, and a tubular member disposed in the axial opening and rotatably supporting said body and holding said latch means in said pocket between said body and said member.

6. A tubular member, a moulded plastic body rotatably carried by said member, an integral pocket in said body, and latch means in said pocket, said latch means having a leg portion bearing against the bottom of the pocket with a holding part extended exteriorly of the body for engagement with receiving means and another leg portion bearing against the tubular member for yieldably urging the holding part outwardly to a predetermined position.

CHARLES S. PENFOLD.

REFERENCES CITED

The following references are of record in the file of this patent:

UNITED STATES PATENTS

| Number | Name | Date |
|---|---|---|
| 593,191 | Bernhardt | Nov. 9, 1897 |
| 2,064,397 | White | Dec. 15, 1936 |
| 2,102,802 | Lofgren | Dec. 21, 1937 |
| 2,190,882 | Pardee | Feb. 20, 1940 |
| 2,222,018 | Bruce | Nov. 19, 1940 |
| 2,245,151 | Martinet | June 10, 1941 |